United States Patent
Patel et al.

(10) Patent No.: US 9,654,247 B2
(45) Date of Patent: May 16, 2017

(54) GROOMING MULTICAST TRAFFIC IN FLEXIBLE OPTICAL WAVELENGTH DIVISION MULTIPLEXING WDM NETWORKS

(71) Applicant: NEC Laboratories America, Inc., Princeton, NJ (US)

(72) Inventors: Ankitkumar Patel, Monmouth Junction, NJ (US); Philip Ji, Cranbury, NJ (US)

(73) Assignee: NEC Corporation, Tokyo (JP)

( * ) Notice: Subject to any disclaimer, the term of this patent is extended or adjusted under 35 U.S.C. 154(b) by 128 days.

(21) Appl. No.: 14/613,743

(22) Filed: Feb. 4, 2015

(65) Prior Publication Data

US 2015/0222386 A1    Aug. 6, 2015

Related U.S. Application Data

(60) Provisional application No. 61/935,443, filed on Feb. 4, 2014.

(51) Int. Cl.
*H04J 14/00*    (2006.01)
*H04J 14/02*    (2006.01)
*H04L 12/721*   (2013.01)
*H04B 10/00*    (2013.01)

(52) U.S. Cl.
CPC .......... *H04J 14/0256* (2013.01); *H04B 10/00* (2013.01); *H04J 14/0212* (2013.01); *H04J 14/0224* (2013.01); *H04J 14/0257* (2013.01); *H04J 14/0258* (2013.01); *H04J 14/0271* (2013.01); *H04L 45/12* (2013.01); *H04L 45/62* (2013.01)

(58) Field of Classification Search
None
See application file for complete search history.

(56) References Cited

U.S. PATENT DOCUMENTS

2012/0251117 A1* 10/2012 Patel .................. H04J 14/0224
                                                    398/79

OTHER PUBLICATIONS

Jinno et al., "Distance-Adaptive Spectrum Resource Allocation in Spectrum-Sliced Elastic Optical Path Network", Aug. 2010, IEEE Communications Magazine, pp. 138-145.*
M. Jinno et al., "Spectrum-Efficient and Scalable Elastic Optical Path Network: Architecture Benefits, and Enabling Technologies" IEEE Communication Magazine:66-73 (Nov. 2009).
A.N. Patel et al., "Defragmentation of Transparent Flexible Optical WDM (FWDM) Networks" Proceeding of the OFCNFOEC )Tu18 (Mar. 2011).

(Continued)

*Primary Examiner* — Ken N Vanderpuye
*Assistant Examiner* — David Lambert
(74) *Attorney, Agent, or Firm* — Joseph Kolodka

(57) ABSTRACT

There is provided a distance-adaptive and fragmentation-aware all-optical traffic grooming (DFG) method, which addresses the all-optical traffic grooming problem while considering the transmission reach constraints. The DFG procedure provisions traffic demands in optical channels such that the spectrum requires for guard bands is minimized. The DFG procedure provisions optical channels such that network fragmentation is minimized while ensuring the transmission reach constrains over flexible-grid WDM networks.

14 Claims, 3 Drawing Sheets

(56) References Cited

OTHER PUBLICATIONS

A.N. Patel et al., "Optical-Layer Traffic Grooming in Flexible Grid WDM Networs" Proceeding of the IEEE Globecom (Dec. 2011).
S. Gringeri et al., "Flexible Architectures for Optical Transport Nodes and Networks" IEEE Communication Magazine:44-50 (Jul. 2010).
International Telecommunication Union—Standardization Section of ITU, "Spectral Grids for WDM Applications: DWDM Frequency Grid" ITU-T G.694.1 (Jun. 2002).
G. Zhang et al., "Optical Grooming in OFDM-Based Elastic Optical Networks" Proceeding of the OFCNFOEC OTh1A.1 (Mar. 2012).

* cited by examiner

GROOMING MULTICAST TRAFFIC IN FLEXIBLE OPTICAL WAVELENGTH DIVISION MULTIPLEXING WDM NETWORKS

RELATED APPLICATION INFORMATION

This application claims priority to provisional application Ser. No. 61/935,443 filed on Feb. 4, 2014, entitled "Distance-Adaptive and Fragmentation-Aware All Optical Traffic Grooming Procedure in Flexible Grid WDM Networks", the contents thereof are incorporated herein by reference.

BACKGROUND

The present invention relates optical communications, and, more particularly, to distance-adaptive and fragmentation-aware all optical traffic grooming procedure in flexible grid wavelength division multiplexing WDM networks.

The following background documents are discussed in the present application:
[ITU-T] ITU-T G.694.1, "Spectral grids for WDM applications: DWDM frequency grid," May 2002.
[SGringeri] S. Gringeri, B. Basch, V. Shukla, R. Egorov, and T. J. Xia, "Flexible Architectures for Optical Transport Nodes and Networks," *IEEE Communication Magazine*, pp. 40-50, July 2010.
[M.Jinno] M. Jinno, H. Takara, B. Kozicki, Y. Tsukishima, Y. Sone, and S. Matsuoka, "Spectrum-Efficient and Scalable Elastic Optical Path Network: Architecture, Benefits, and Enabling Technologies," *IEEE Communication Magazine*, pp. 66-73, November 2009.
[APatel1] A. N. Patel, P. N. Ji, J. P. Jue, and T. Wang, "Routing, Wavelength Assignment, and Spectrum Allocation in Transparent Flexible Optical WDM (FWDM) Networks," *Proceeding of OSA Photonics in Switching*, PDPWG1, July 2010
[GZhang] G. Zhang, M. D. Leenheer, and B. Mukherjee, "Optical Grooming in OFDM-Based Elastic Optical Networks," *Proceeding of OFCNFOEC*, no. OTh1A.1, March 2012.
[APatel2] A. N. Patel, P. N. Ji, T. Wang, and J. P. Jue, "Optical-Layer Traffic Grooming in Flexible Grid WDM Networks," *Proceeding of IEEE GLOBECOM*, December 2011.
[APatel3] A. N. Patel, P. N. Ji, J. P. Jue, and T. Wang, "Defragmentation of Transparent Flexible Optical WDM (FWDM) Networks," *Proceeding of OFCNFOEC*, no. OTuI8, March 2011.

In the ITU-T standardized fixed grid networks [ITU-T], fixed amount of spectrum (50 GHz) is allocated to every channel irrespective of the operating line rate, and the center frequency of a channel remains fixed (FIG. 1(a)). Such a fixed channel grid may not be sufficient to support immerging super-channels which operates at 400 Gb/s or 1 Tb/s line rates. For example, 50 GHz of spectrum is not sufficient for 400 Gb/s and 1 Tb/s channels which require 75 GHz and 150 GHz [SGringeri] of spectrum respectively. On the other hand, supporting such super-channels by increasing the channel spacing in fixed grid networks may not optimize the spectrum allocation for channels operating at lower line rates. For example, 10 Gb/s channel requires only 25 GHz of spectrum. Thus, no single fixed channel grid is optimal for all line rates.

There has been growing research on optical WDM systems that are not limited to fixed ITU-T channel grid, but offers flexible channel grid to increase spectral efficiency [MJinno]. We refer to such gridless networks as Flexible Grid WDM Networks. In such networks, flexible amount of spectrum is allocated to each channel, and the channel center frequency may not be fixed (FIG. 1(b)). Thus, while establishing a channel in flexible grid networks, control plane must follow (1) the requirement of having the same operating wavelength on all fibers along the route of a channel which is referred to as the wavelength continuity constraint, (2) the requirement of allocating the same amount of spectrum on all fibers along the route of a channel which is referred to as the spectral continuity constraint, and (3) the requirement of allocating non-overlapping spectrum with the neighboring channels in the fiber which is referred to as the spectral conflict constraint. The problem of finding a channel satisfying these constraints is referred to as the routing, wavelength assignment, and spectrum allocation (RWSA) problem [APatel1].

FIG. 1 shows a comparison of (a) fixed grid WDM network and (b) Flexible WDM network. Flexible grid networks remove the fixed channel grid restriction and allow non-uniform and dynamic allocation of spectrum. Channels with finer granularity line rates can be supported by using Orthogonal Frequency Division Multiplexing (OFDM) modulation scheme with variable subcarrier assignment. Such channels are referred to as flexible channels. In spite of a flexible spectrum allocation, the spectral utilization of channels may be limited if the network supports a discrete sets of line rates. Additionally, there is still a requirement of allocating guard bands between channels in order to avoid inter-channel interferences. The total required spectrum for guard bands increases in proportion to the number of multiplexed channels in a fiber. For example, supporting 10 individual connections demanding 10 Gb/s line rates per connection using 10 of the 10 Gb/s flexible channels allocate 10 times more spectrum for guard bands compared to supporting the same amount of traffic using a single 100 Gb/s channels and aggregating all connections in a single channel. An effective solution to improve the utilization of flexible channels. To reduce wasted spectrum in terms of guard bands is to aggregate low speed connections onto high capacity channels. Such functionality is referred to as traffic grooming. Thus, by aggregating low rate connections onto high rate channels, traffic grooming improves the bandwidth utilization of WDM channels, and by reducing the number of multiplexed channels in the fiber, traffic grooming improves the spectral utilization.

Conventionally, traffic grooming operations are performed at an electrical layer. In electrical traffic grooming, WDM spectrum at the incoming ports are first demultiplexed into individual wavelength channels using bandwidth variable demultiplexer. Channels carrying transit traffic are switched all-optically using an optical cross-connect (OXC). Low speed connections in the wavelength channels are aggregated, separated, and switched using an electrical switch fabric that is capable of TDM circuit switching or packet switching by converting input optical signals into electrical signals using bandwidth variable (BV) transponders. Finally, the groomed electrical traffic is converted back to optical signals using variable rate transponders. Thus, electrical traffic grooming improves the utilization of bandwidth and spectral resources of a network; however, this approach is very costly due to the requirement of additional transponders, and power hungry due to Optical-Electrical-Optical (OEO) conversions of WDM channels.

Recently, in [GZhang], the concept of all-optical traffic grooming is proposed in which connections are supported over optical subcarriers, and these optical subcarriers are optically groomed into the same optical channel (also referred to as optical tunnel) that is originated from the same source (bandwidth variable transponder) without guard bands. Traffic demands between the same source and different destinations can be supported as a single optical tunnel using bandwidth variable (BV) OXCs. A subset of subcarriers in this optical tunnel can be dropped at an intermediate node or switched over other routes. However, when switching a subset of subcarriers, guard bands must be allocated at both sides of this set of subcarriers for subsequent switching in the network. This added guard band is used to avoid inter-channel interference since it is difficult to maintain orthogonality between subcarriers those are generated from different transponders, and thus, in all-optical traffic grooming, only source grooming is considered. All-optical traffic grooming is illustrated in FIG. 2 [GZhang]. As shown in Figure, an optical tunnel is established at node a that carries optical connections for node b, node e, and node d. Optical subcarriers for node b are dropped at node b, while optical subcarriers for node d and node e are switched at node c using BV-OXCs. After switching a subset of subcarriers, guard bands are added to the both sides of this set of subcarriers.

One of the control plane issues in all-optical traffic grooming is: for a given configuration of the optical network in terms of the locations of optical nodes and deployed fibers connecting optical nodes, the spectral capacity of a fiber link, bandwidth variable (BV) transponders with the maximum transmission capacity, a set of offered modulation formats offered by a BV transponder, the spectral efficiency and transmission reach limit of each modulation format, the required spectrum of a guard band, and a set of traffic demands, where each traffic demand requests a finite data rate between a source node and a destination node, the problem is how to support traffic demands with optical subcarriers, how to aggregate all optical subcarriers into optical channels (optical tunnels), how to route optical channels over the network, how to assign wavelength, and allocate spectrum to these optical channels such that the maximum requires spectrum in the network is minimized. Together the problem is referred to as all-optical traffic grooming problem in flexible grid WDM networks.

While establishing optical channels in flexible grid networks, some additional constraints, such as (1) spectral continuity constraint, which is defined as the allocation of same amount of spectrum on all links along the route, and (2) spectral conflict constraint, which is defined as a non-overlapping spectrum allocation to neighboring channels routed though the same fiber, must be maintained in addition to the conventional wavelength continuity constraint, which is defined as the allocation of the same wavelength on all links along the route of a channel.

In [APatel2], the authors introduce the concept of optical-layer traffic grooming in which the grooming operations, add, drop, and switch, are performed at the radio frequency (RF) layer after OEO conversions of optical channels. While all-optical traffic grooming is performed without OEO conversions of optical channels. Since the optical-layer traffic grooming approach can aggregate subcarriers originated from different BV-transponders onto the same optical channels, the control plane solution of the optical-layer traffic grooming cannot be applicable to the all-optical traffic grooming problem.

In [GZhang], the authors propose the first solution, Least Spectrum Grooming (LSG) procedure, for all-optical traffic grooming. However, the solution does not take into account the transmission reach oriented constraints.

Accordingly, there is a need for a distance-adaptive and fragmentation-aware all optical traffic grooming capability in flexible grid wavelength division multiplexing WDM networks.

SUMMARY OF THE INVENTION

A computer implemented method for performing all optical traffic grooming in an optical network, including providing distance-adaptive and fragmentation-aware all-optical traffic grooming that enables all-optical traffic grooming responsive to provisioning of traffic demands in optical channels such that the spectrum required for guard bands is minimized, such that network fragmentation is minimized while ensuring transmission limits over flexible-grid wavelength0-division multiplexed WDM networks are reached, the providing includes routing a groomed channel, selecting a modulation format for the groomed channel, selecting traffic demands to be aggregated in the groomed channel; and determining a size of the groomed channel to avoid spectral fragmentation.

In an alternative aspect of the same invention, there is provided a non-transitory storage medium with instructions for a computer to implement performing all optical traffic grooming in an optical network including providing distance-adaptive and fragmentation-aware all-optical traffic grooming that enables all-optical traffic grooming responsive to provisioning of traffic demands in optical channels such that the spectrum required for guard bands is minimized, such that network fragmentation is minimized while ensuring transmission limits over flexible-grid wavelength0-division multiplexed WDM networks are reached, the providing includes routing a groomed channel, selecting a modulation format for the groomed channel, selecting traffic demands to be aggregated in the groomed channel, and determining a size of the groomed channel to avoid spectral fragmentation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
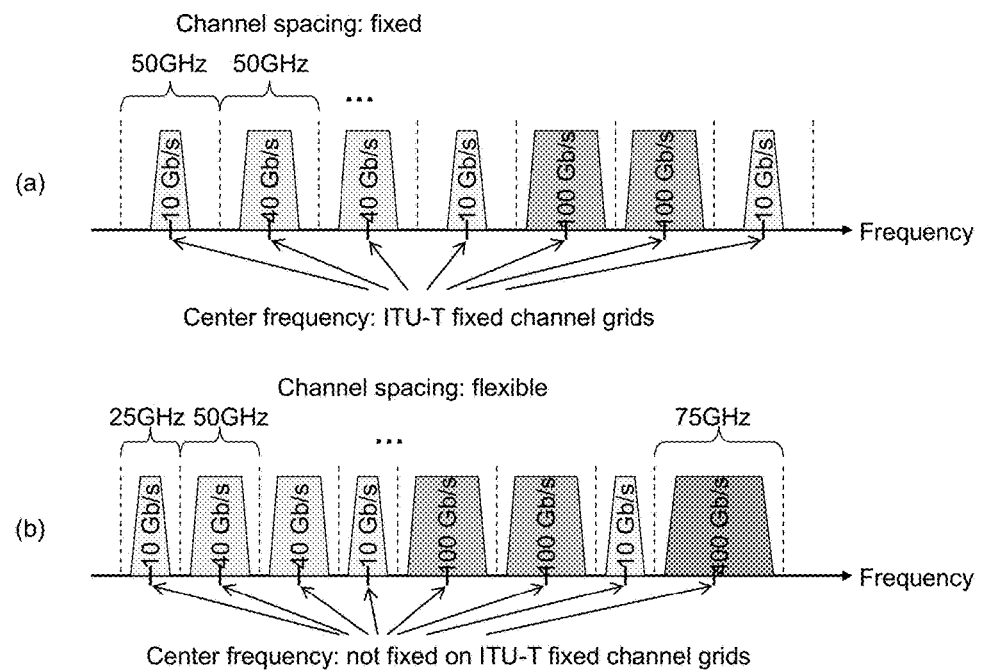
FIG. 1(a), (b) depicts fixed transmission channel spacing and flexible transmission channel spacing to which the inventive method is directed.
Figure 2:
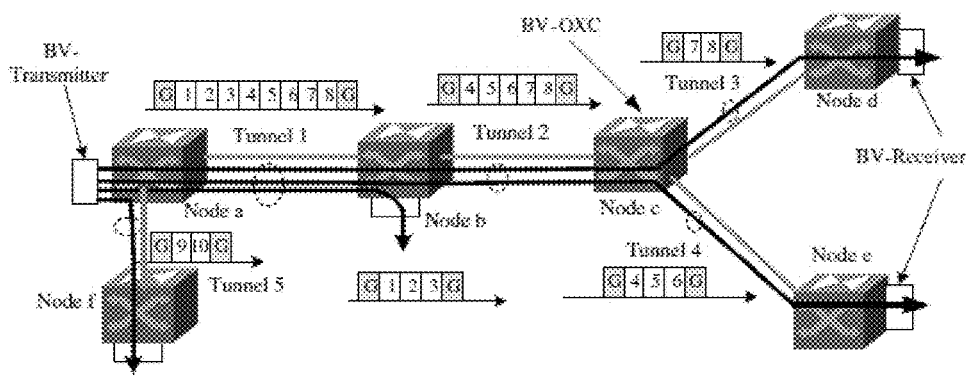
FIG. 2 is a diagram depicting a genetic encoding in accordance with the invention.
Figure 3:
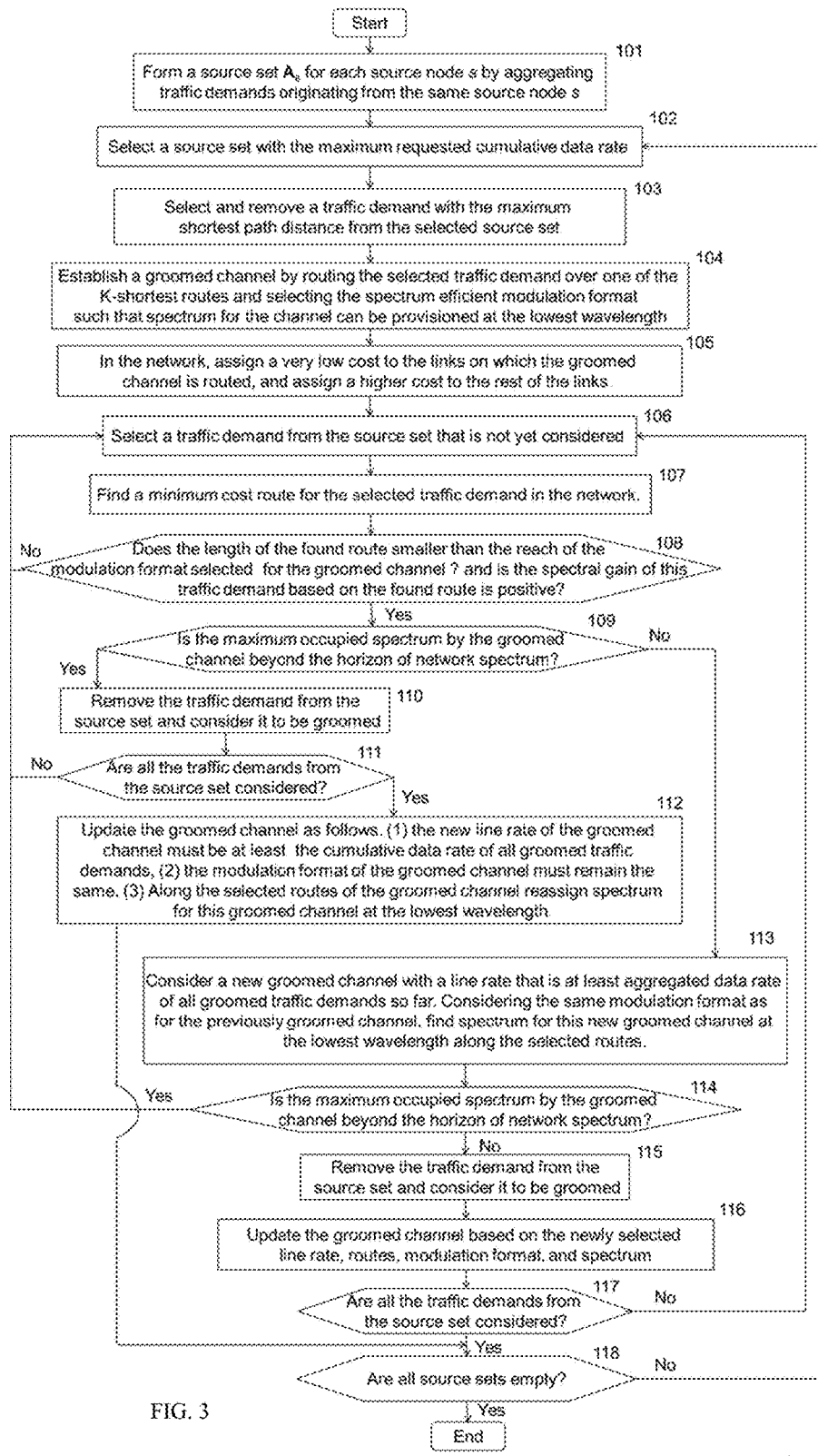
FIG. 3 is a diagram depicting an illustrative scenario, in accordance with the invention.
Figure 4:
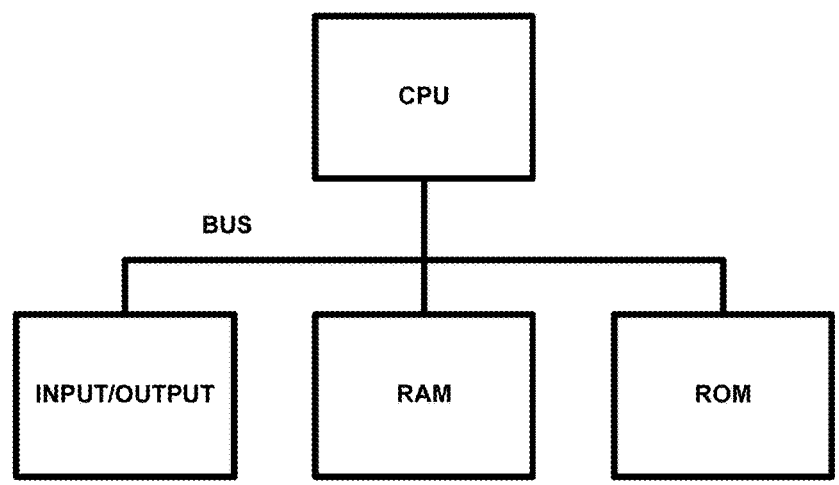
FIG. 4 shows an exemplary computer for carrying out the invention.

The present invention is directed to a novel computer implemented method, namely. Here, we design the first procedure, namely distance-adaptive and fragmentation-aware all-optical traffic grooming (DFG) procedure, which addresses the all-optical traffic grooming problem while considering the transmission reach constraints. The DFG procedure provisions traffic demands in optical channels such that the spectrum requires for guard bands is minimized. The DFG procedure provisions optical channels such that network fragmentation [APatel3] is minimized while ensuring the transmission reach constrains over flexible-grid WDM networks.

In the inventive DFG procedure, the traffic demands originated from the same source node s are aggregated in a source set $A_s$. The procedure first forms a source set $A_s$ for each source node s in the network. The traffic demands from the same source set can potentially be aggregated into the same optical channel (referred to as optical tunnel or groomed channel). Let's denote a traffic demands j as $R_j(s, d, b)$, where s is a source node, d is a destination node, and b is the requested data rate. The length (in terms of the number of hops) of a groomed channel supporting traffic demand j is denoted as $L_{GC}^j$, while the shortest path distance (in terms of the number of hops) between source s and destination d is denoted as $L_{SP}^j$. The spectral efficiency of a groomed channel is denoted as $E_{GC}$ based on the modulation format and the distance traveled by the groomed channel. $E_{SP}^j$ denotes the optimal spectral efficiency of a traffic demand j if the demand is provisioned along the shortest path. A segment of a groomed channel in which a traffic demand j is groomed with other traffic demands is referred to as a groomed segment of traffic demand j. The length (in terms of the number of hops) of traffic demand j's groomed segment is denoted as $L_{GS}^j$. The spectrum required for a guard band is denoted as W GHz.

All optical traffic grooming brings spectral gain due to the guard band savings in the groomed segments of optical channels. On the other hand, it may cause spectral loss due to the selection of sub-optimal routes and modulation formats while meeting the transmission reach requirements of other members within the groomed channel. The spectral gain per traffic demand obtained through all-optical traffic grooming is defined as follows:

$$G_j = (2 \times W \times L_{GS}^j) - \left( \left[ \frac{b \times L_{GC}^j}{E_{GC}} \right] - \left[ \frac{b \times L_{SP}^j}{E_{SP}^j} \right] \right) \quad (1)$$

The DFG procedure first forms a source sets $A_s$ by aggregating traffic demands originating from the same source node s. The procedure selects a source set in which traffic demands request the maximum cumulative data rate. From the selected source set, the procedure selects a traffic demand with the maximum shortest path distance between source and destination nodes. An initial groomed channel containing just the selected traffic demand is first established. For the groomed channel, a route is selected out of the K-shortest routes, and a spectral efficient modulation format is selected which meets the transmission reach requirement, such that spectrum for the groomed channel can be provisioned at the lowest wavelength. Next, the procedure assigns a very low cost to the links on which the groomed channel is routes, and a high cost is assigned to the rest of the links. Each traffic demand from the same source set is routed over the minimum cost route one-by-one. If the length of the found route of the selected traffic demand is smaller than the reach of the selected modulation format for the groomed channel, and if the spectral gain of the traffic demand based on the selected route is positive, then the selected traffic demand can potentially be groomed within the groomed channel. In flexible grid network, optical spectrum may be fragmented due to the wavelength and spectral continuity constraints. Such spectral fragmentation may lead to blocking of optical channels and reduce network throughput. To minimize spectral fragmentation in a network, the procedure forms groomed channels with spectral widths equivalent to the spectral fragments along the routes with higher priority. Thus, the procedure checks weather the occupied spectrum by the groomed channel is beyond the horizon of network spectrum.

If the occupied spectrum by the groomed channel is higher than the horizon of network spectrum, then the procedure selects the traffic demands that can potentially be groomed. The groomed channel is aggregated with all these selected traffic demands, and these selected traffic demands are removed from the source set. Considering the modulation format of this new groomed channel to be the same as that of the previous groomed channel, and the line rate of this new groomed channel to be at least the aggregated data rate of the groomed traffic demands, the procedure finds new spectrum at the lowest wavelength on the selected routes. The groomed channel is updated based on this new routing and spectrum assignment solutions.

If the occupied spectrum by the groomed channel is lower than the horizon of network spectrum, then the selected traffic demand along with the previous groomed channel is considered as a potentially new groomed channel. Considering the modulation format of this new groomed channel to be the same as that of the previous groomed channel, and the line rate of this new groomed channel to be at least the aggregated data rate of the groomed traffic demands, the procedure finds new spectrum at the lowest wavelength on the selected routes. If the new spectrum is still lower that the spectral horizon of the network, then the selected traffic demand is removed from the source set, and the procedure updates the groomed channel by aggregating the selected traffic demand. The routes and spectrum assignment are also updated based on the found solutions. On the other hand, if the new spectrum is beyond the horizon of network spectrum, then the procedure does not groom the selected traffic demand and selects a new traffic demand from the source set.

After considering all traffic demands from the selected source set, the procedure repeats the same procedure to establish a new groomed channel for a source set which contains traffic demands with the maximum cumulative data rates.

The detailed steps of the procedure are described as follows:

101: The procedure forms a source set $A_s$ for each source node s by aggregating traffic demands originating from the same source node s.

102: The procedure selects a source set with the maximum requested cumulative data rate.

103: The procedure selects and removes a traffic demand with the maximum shortest path distance from the selected source set.

104: The procedure establishes a groomed channel by routing the selected traffic demand over one of the K-shortest routes and selecting the spectrum efficient modulation format such that spectrum for the channel can be provisioned at the lowest wavelength.

105: The procedure assigns a very low cost to the links on which the groomed channel is routed in the network, and assigns a higher cost to the rest of the links.

106: The procedure selects a traffic demand from the source set that is not yet considered.

107: The procedure finds a minimum cost route for the selected traffic demand in the network.

108: The procedure checks two conditions for the selected traffic demand; (1) Does the length of the found route smaller than the reach of the modulation format selected for the groomed channel, and (2) is the spectral gain of this traffic demand based on the found route is positive? If both of these conditions hold true, then the procedure follows Step 109, otherwise the procedure follows Step 106.

109: The procedure checks weather the maximum occupied spectrum by the groomed channel is beyond the horizon of network spectrum? If the maximum occupied spectrum by the groomed channel is smaller or equal to the horizon of network spectrum, then the procedure follows step 113, otherwise the procedure follows Step 110.

110: The procedure removes the traffic demand from the source set and considers it to be groomed.

111: The procedure checks weather all the traffic demands are considered from the source set. If it is, then the procedure follows Step 112, otherwise the procedure repeats Step 106.

112: Finally, the procedure updates the groomed channel as follows. (1) The new line rate of the groomed channel must be at least the cumulative data rate of all groomed traffic demands, (2) the modulation format of the groomed channel must remain the same, and (3) Along the selected routes of the groomed channel, reassign spectrum for this groomed channel at the lowest wavelength.

113: The procedure considers a new groomed channel with a line rate that is at least aggregated data rate of all groomed traffic demands so far. By considering the same modulation format as for the previously formed groomed channel, the procedure finds spectrum for this new groomed channel at the lowest wavelength along the selected routes.

114: The procedure again checks weather the maximum occupied spectrum by the groomed channel is beyond the horizon of network spectrum. If it is, then the procedure follows Step 106, otherwise the procedure follows Step 115.

115: The procedure removes the traffic demand from the source set and considers it to be groomed.

116: The procedure updates the groomed channel based on the newly selected line rate, routes, modulation format, and spectrum.

117: The procedure checks weather all the traffic demands are considered from the source set. If it is, then the procedure follows Step 118, otherwise the procedure repeats Step 106.

118: The procedure checks weather all source sets are empty. If they are, then the procedure terminates, otherwise the procedure repeats Step 102.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

By way of example, a block diagram of a computer to support the invention is discussed next in FIG. 7. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing the following can be appreciated from the inventive distance-adaptive and fragmentation-aware all-optical traffic grooming (DFG): The DFG procedure improves the spectral efficiency of flexible grid networks. The DFG procedure decreases the connection blocking probability in flexible grid networks. The DFG procedure is the first practical and complete control plane solution for all-optical traffic grooming in flexible grid networks. The DFG procedure reduces the number of required transponders in flexible grid network. The DFG procedure reduces the power consumption in flexible grid networks. The DFG procedure increases the traffic carrying capacity of networks Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for performing all optical traffic grooming in an optical network, comprising:
   providing traffic grooming that enables all-optical traffic grooming responsive to provisioning of traffic demands in optical channels such that a spectrum required for guard bands over flexible-grid wavelength[0]-division multiplexed WDM networks is reached, the providing comprising:
   routing a groomed channel,
   selecting a modulation format for the groomed channel,
   selecting traffic demands to be aggregated in the groomed channel; and
   determining a size of the groomed channel to avoid spectral fragmentation by:
      if a spectrum occupied by the groomed channel is higher than a threshold of network spectrum, selecting traffic demands to be groomed and aggregating the selected traffic demands, and removing selected traffic demands from a source set;
      considering a modulation format of a new groomed channel to be the same as that of a previous groomed channel, and a line rate of the new groomed channel to be at least an aggregated data rate of groomed traffic demands, locating new spectrum at a lowest wavelength on selected routes and updating the groomed channel based on a new routing and spectrum assignment.

2. The method of claim 1, wherein the step of routing a groomed channel comprises a groomed channel being first routed over one of a number of shortest routes, and subsequently, traffic demands starting from same source nodes overlap their routes with routes of an established groomed channel.

3. The method of claim 1, wherein the step of selecting a modulation format for the groomed channel comprises selecting a modulation format supporting a shortest path distance of traffic demands originated from a same source node.

4. The method of claim 1, wherein the step of selecting traffic demands to be aggregated in the groomed channel comprises a set of traffic demands originated from a same source node being potentially aggregated in a groomed channel, eligibility for an aggregation being determined based on a route length, spectral gain, and availability of spectrum in an iterative manner.

5. The method of claim 1, wherein the step of determining a size of the groomed channel to avoid spectral fragmentation comprises aggregating traffic demands in a groomed channel enabling a groomed channel to be provisioned below the threshold of network spectrum.

6. The method of claim 1, wherein the step of routing a groomed channel comprises updating a groomed channel as follows: a new line rate of the groomed channel must be at least a cumulative data rate of all groomed traffic demands, the modulation format of the groomed channel must remain the same, and along selected routes of the groomed channel there is a reassignment of spectrum for the groomed channel at a lowest wavelength.

7. The method of claim 1, wherein the step of routing a groomed channel comprises considering a new groomed channel with a line rate that is at least an aggregated data rate of all groomed traffic demands, and considering the same modulation format as for a previously groomed channel and finding for the new groomed channel at least a lowest wavelength along selected optical network routes.

8. A non-transitory storage medium with instructions for a computer to implement performing all optical traffic grooming in an optical network comprising the following steps:
providing traffic grooming that enables all-optical traffic grooming responsive to provisioning of traffic demands in optical channels such that a spectrum required for guard bands over flexible-grid wavelength[0]-division multiplexed WDM networks is reached, the providing comprising:
routing a groomed channel,
selecting a modulation format for the groomed channel,
selecting traffic demands to be aggregated in the groomed channel; and
determining a size of the groomed channel to avoid spectral fragmentation by:
if a spectrum occupied by the groomed channel is higher than a threshold of network spectrum, selecting traffic demands to be groomed and aggregating the selected traffic demands, and removing selected traffic demands from a source set;
considering a modulation format of a new groomed channel to be the same as that of a previous groomed channel, and a line rate of the new groomed channel to be at least an aggregated data rate of groomed traffic demands, locating new spectrum at a lowest wavelength on selected routes and updating the groomed channel based on a new routing and spectrum assignment.

9. The non-transitory storage medium of claim 8, wherein the step of routing a groomed channel comprises a groomed channel being first routed over one of a number of shortest routes, and subsequently, traffic demands starting from same source nodes overlap their routes with routes of an established groomed channel.

10. The non-transitory storage medium of claim 8, wherein the step of selecting a modulation format for the groomed channel comprises selecting a modulation format supporting a shortest path distance of traffic demands originated from a same source node.

11. The non-transitory storage medium of claim 8, wherein the step of selecting traffic demands to be aggregated in the groomed channel comprises a set of traffic demands originated from a same source node being potentially aggregated in a groomed channel, eligibility for an aggregation being determined based on a route length, spectral gain, and availability of spectrum in an iterative manner.

12. The non-transitory storage medium of claim 8, wherein the step of determining a size of the groomed channel to avoid spectral fragmentation comprises aggregating traffic demands in a groomed channel enabling a groomed channel to be provisioned below the threshold of network spectrum.

13. The non-transitory storage medium of claim 8, wherein the step of routing a groomed channel comprises updating a groomed channel as follows: a new line rate of the groomed channel must be at least a cumulative data rate of all groomed traffic demands, the modulation format of the groomed channel must remain the same, and along selected routes of the groomed channel there is a reassignment of spectrum for the groomed channel at a lowest wavelength.

14. The non-transitory storage medium of claim 8, wherein the step of routing a groomed channel comprises considering a new groomed channel with a line rate that is at least an aggregated data rate of all groomed traffic demands, and considering the same modulation format as for a previously groomed channel and finding for the new groomed channel at least a lowest wavelength along selected optical network routes.

* * * * *